June 2, 1925.  
E. R. BURTNETT  
INTERNAL COMBUSTION ENGINE  
Filed July 31, 1924
1,540,459
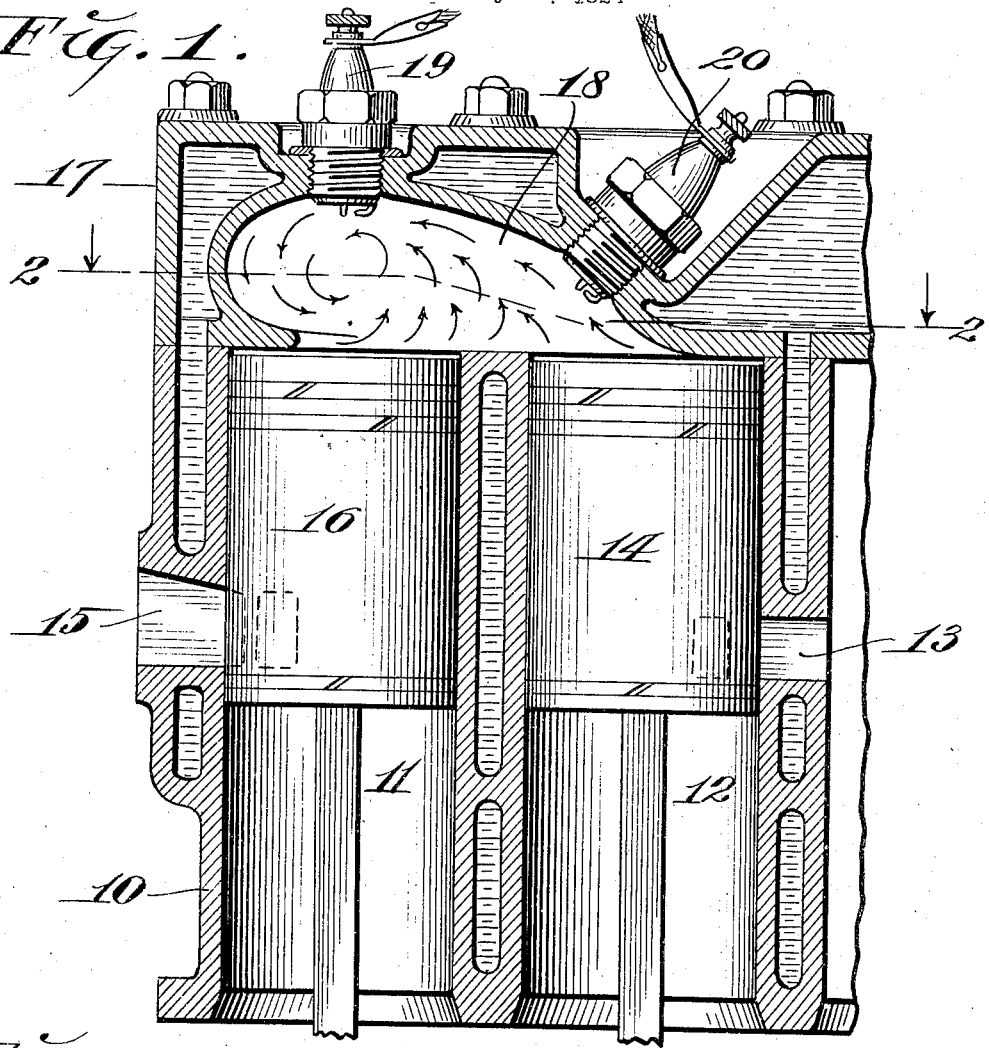
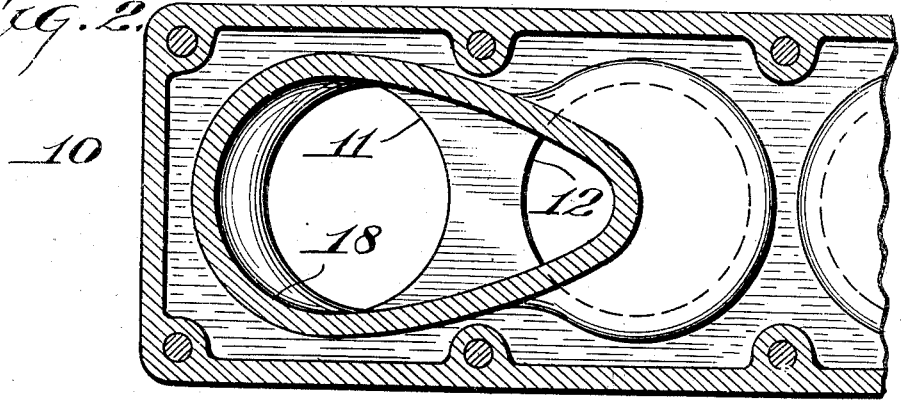

Patented June 2, 1925.

1,540,459

UNITED STATES PATENT OFFICE.

EVERETT R. BURTNETT, OF LOS ANGELES, CALIFORNIA, ASSIGNOR OF ONE-HALF TO HOMER A. BRUNELL, OF LOS ANGELES, CALIFORNIA.

INTERNAL-COMBUSTION ENGINE.

Application filed July 31, 1924. Serial No. 729,300.

*To all whom it may concern:*

Be it known that I, EVERETT R. BURTNETT, a citizen of the United States, residing at Los Angeles, in the county of Los Angeles and State of California, have invented certain new and useful Improvements in Internal-Combustion Engines, of which the following is a specification.

My invention relates to internal combustion engines that operate on the two stroke cycle principle, the principal object of my invention being to provide in the head of the engine a combined compression and combustion chamber that functions as a common clearance space for all combustion cylinders and within which common clearance space, the combined residual and fresh gaseous fuel charge is caused to be highly agitated, thereby effecting a thorough and intimate mixture of said residual and fresh gaseous fuel throughout the compression stroke of the pistons within the two combustion cylinders.

Inasmuch as the clearance space within the head is common to the two combustion cylinders, the forcing of the compressed charge of residual and fresh gases into said clearance chamber produces a high degree of turbulence within said common chamber, and as a result of such condition the rapidity of flame propagation through the entire fuel charge after ignition will be materially increased and, further, the thorough mixture of the residual products of combustion and fresh fuel gases will tend to decrease combustion temperatures and, consequently, reduce the tendency of the charge to detonate.

To accomplish the desired results, I form within the head of the engine a substantially oval chamber that is common to two of the combustion chambers of the engine, and locate a charge igniting device immediately adjacent to the compressed fuel charge outlet from the combustion chamber to which the fresh fuel charge is inducted. This arrangement accomplishes a satisfactory and uniform firing of the fuel charge at all times, regardless of load or gaseous fuel mixture ratio to the volume of residual gases remaining in the combined combustion cylinders and clearance as an initial charge volume. Since the relatively small quantity of fresh gaseous fuel needed for idling or for light load operation will be inducted and remain in a stratum directly over the piston of the cylinder in which the inlet ports are located, and as said small quantity of gaseous fuel will not reach the vicinity of the clearance chamber where the charge is being agitated, until the very end of the compression stroke and at the time of ignition of the gaseous fuel charge, the flow of clean gaseous fuel will be undiluted by the relatively great volume of residual gases remaining in the cylinder at light loads and will pass directly across the ignition device that is located at the opening between the cylinder having the inlet ports and the common clearance chamber.

When the engine load is increased and any appreciable volume of fresh fuel is inducted in proper ratio to the residual volume, the gaseous mixture excepting the small quantity located directly over the piston within the chamber having the fuel inlet ports will enter the clearance chamber as early, during the compression stroke of the pistons, as the ratio of inducted charge of gaseous fuel is in volume to the total piston displacement. Hence, as the engine load is increased and the gaseous fuel charge volume increases, a relative and properly proportioned increase and mixture of the gaseous fuel with the residual gases will be produced in the common clearance and combustion chamber.

With the foregoing and other objects in view; my invention consists in the features of construction and combination and arrangement of parts hereinafter more fully described and claimed, reference being had to the accompanying drawings, in which:

Figure 1 is a vertical section taken through the center of a pair of combustion cylinders of an engine, showing the head thereof provided with a turbulence chamber as contemplated by my invention;

Figure 2 is a horizontal section taken on the line 2—2 of Figure 1.

Referring by numerals to the accompanying drawings, 10 designates an engine cylinder block, 11 and 12 a pair of combustion chambers within said block, 13 gaseous fuel inlet ports that lead into the combustion chamber 12 and which are uncovered and open during the time that the piston 14 within said chamber 12 passes low center, and 15 exhaust ports that are formed in the wall of cylinder block surrounding combustion chamber 11, which exhaust ports are uncovered and open only when piston 16 that operates within chamber 11 passes low center.

Secured on the head end of block 10 is is a head block 17 within which is formed a substantially oval-shaped turbulence chamber 18, that opens on the under face of the head block and, therefore, said chamber communicates directly with the head or inner ends of combustion chambers 11 and 12. Chamber 18 constitutes a common clearance compression and ignition chamber for the combustion chambers 11 and 12, and seated in head 17 and preferably at a point coincident with the axis of cylinder 11 is a spark plug 19, the inner ends of the electrodes of which project into the upper portion of chamber 18.

Seated in head 17 above that portion of the chamber that communicates with combustion chamber 12 is a spark plug 20, the terminals of the electrodes of which project into the end portion of chamber 18 that is directly above chamber 12. This spark plug 20 is arranged so that the inner ends of the terminals of its electrodes are positioned a relatively short distance above the under surface of head block 17, and thus the spark produced between said electrodes occurs in a plane that is but a short distance above the head end of piston 14 when the latter is at the upper or inner end of its travel.

In the operation of my improved engine, the pistons 14 and 16 is passing low center uncover inlet ports 13 and exhaust ports 15, and as said ports are thus uncovered a gaseous fuel charge under pressure will enter ports 13 and pass upwardly through chamber 12. From said chamber 12 this gaseous fuel charge will pass through turbulence chamber 18, thence downward through combustion chamber 11 and in so doing said gaseous fuel charge will drive before it a substantial portion of the products of combustion remaining in the combustion chambers and turbulence chamber from the previously ignited charge, and this substantial portion of the products of combustion will be driven out through exhaust ports 15.

As pistons 14 and 16 start on their upward or inward movement, the ports 13 and 15 will be closed, and as said pistons continue to move inwardly the inducted gaseous fuel charge and the residual products of combustion will be compressed within chamber 18 and this compression will set up within said chamber the desired turbulence and mixture of the fresh gaseous fuel and residual products of combustion, which turbulence and agitation prevails as the pistons pass high center. During this state of agitation or turbulence, sparks are produced between the terminals of the electrodes of plugs 19 and 20, thereby igniting the intimate mixture of gaseous fuel and residual products of combustion, and this ignition, occurring during turbulence, will result in rapid flame propagation through the mixture, and the rapid rise in pressure following ignition of the charge will be directed against the heads of pistons 14 and 16 to drive the same downward or outward on their power stroke. Inasmuch as the inducted gaseous fuel is thoroughly and intimately mixed with the residual products of combustion through the action of turbulence within the common clearance chamber, the flame propagation through the entire fuel charge after ignition will take place very rapidly, and as a result of decreased combustion temperatures the undesirable results arising from detonation will be eliminated.

Obviously the construction of the engine as herein illustrated and described may be changed in minor details without departing from the spirit of my invention, the scope of which is set forth in the appended claims.

I claim as my invention:

1. An internal combustion engine having a pair of combustion cylinder chambers, one of said cylinder chambers having a gaseous fuel inlet port and the other cylinder chamber having an exhaust port, a head closing said cylinders, said head having a combined compression and combustion chamber that serves as a common clearance space for the two combustion cylinder chambers, the opening into said common clearance space from the combustion cylinder chamber having the inlet port being smaller in area than the opening between said clearance space and the combustion chamber having the exhaust port, and ignition means seated in the head and projecting into said common clearance space at a point above the combustion cylinder chamber having the gaseous fuel inlet port.

2. An internal combustion engine having a pair of combustion cylinder chambers, one of said chambers having a gaseous fuel inlet port and the other chamber having and exhaust port, a head closing said cylinders, said head having a combined compression and combustion chamber that serves as a common clearance space for the two combustion cylinder chambers, the opening into said clearance space from the combustion cylinder chamber having the inlet ports being smaller in area than the opening between said clearance space and the combustion cylinder chamber having the exhaust port, ignition means seated in the head and projecting into said common clearance space at a point above the combustion cylinder chamber having the gaseous fuel inlet ports, and an ignition device seated in said head and projecting into the common clearance space at a point above the combustion cylinder chamber having the exhaust port.

3. An internal combustion engine having a pair of combustion cylinder chambers, one of which is provided with a gaseous fuel inlet port, the other combustion cylinder chamber having an exhaust port, a head closing said cylinders chambers, which head is provided with a substantially ovoid-shaped chamber that is open on the under side of said head and which serves as a common clearance space for the two combustion cylinder chambers, said ovoid chamber being disposed so that its smaller end communicates with the combustion cylinder chamber having the gaseous fuel inlet port, and an ignition device seated in said head above the combustion chamber having the inlet port projecting into the smaller end of said ovoid chamber.

4. An internal combustion engine having a pair of combustion cylinder chambers, one of which is provided with a gaseous fuel inlet port, the other combustion cylinder chamber having an exhaust port, a head closing said cylinder chambers, which head is provided with a substantially ovoid-shaped chamber that is open on the under side of said head and which serves as a common clearance space for the two combustion cylinder chambers, said ovoid chamber being disposed so that its smaller end communicates with the combustion chamber having the gaseous fuel inlet port, and an ignition device seated in said head above the combustion chamber having the inlet port projecting into the smaller end of said ovoid chamber.

In testimony whereof I affix my signature.

EVERETT R. BURTNETT.